United States Patent [19]
Motzko

[11] Patent Number: 5,633,570
[45] Date of Patent: May 27, 1997

[54] POSITION FEEDBACK CONTROL OF BRUSHLESS DC MOTORS FROM STANDSTILL

[75] Inventor: Andrew R. Motzko, Burnsville, Minn.

[73] Assignee: Seagate Technology, Inc., Scotts Valley, Calif.

[21] Appl. No.: 598,616

[22] Filed: Feb. 12, 1996

[51] Int. Cl.$^6$ .................... H02P 5/00; H02P 6/00
[52] U.S. Cl. ............... 318/439; 318/138; 318/254
[58] Field of Search .................. 318/560–696, 318/254, 138, 245, 728, 439, 702; 360/70–88; 371/43–45, 30; 375/14, 18, 94

[56] References Cited

U.S. PATENT DOCUMENTS

| | | | |
|---|---|---|---|
| 4,228,396 | 10/1980 | Palombo et al. | 318/272 |
| 4,819,221 | 4/1989 | Overath et al. | 369/50 |
| 4,876,491 | 10/1989 | Squires et al. | 318/138 |
| 5,005,089 | 4/1991 | Thanos et al. | 360/77.08 |
| 5,012,166 | 4/1991 | Ushijima et al. | 318/254 |
| 5,117,165 | 5/1992 | Cassat et al. | 318/254 |
| 5,177,417 | 1/1993 | Lee et al. | 318/254 |
| 5,198,733 | 3/1993 | Wright | 318/254 |
| 5,227,930 | 7/1993 | Thanos et al. | 360/78.04 |
| 5,233,275 | 8/1993 | Danino | 318/254 |
| 5,255,136 | 10/1993 | Machado et al. | 360/77.02 |
| 5,262,907 | 11/1993 | Duffy et al. | 360/77.05 |
| 5,298,838 | 3/1994 | Peters et al. | 318/138 |
| 5,341,249 | 8/1994 | Abbott et al. | 360/46 |
| 5,341,387 | 8/1994 | Nguyen | 371/45 |
| 5,382,889 | 1/1995 | Peters et al. | 318/254 |
| 5,517,631 | 5/1996 | Machado et al. | 395/438 |

*Primary Examiner*—Paul Ip
*Attorney, Agent, or Firm*—Westman, Champlin & Kelly, P.A.

[57] ABSTRACT

A method of, and an apparatus for, starting a brushless DC motor from standstill in a magnetic data storage system are disclosed. At least one motor position signal written on at least one magnetic disc surface is sensed. A communication state of the motor is determined as a function of the at least one sensed motor position signal. The motor is controlled based upon the determined commutation state.

14 Claims, 3 Drawing Sheets

POSITION FEEDBACK CONTROL OF BRUSHLESS DC MOTORS FROM STANDSTILL

BACKGROUND OF THE INVENTION

The present invention relates generally to the commutation of brushless DC motors in a disc drive assembly and, more particularly, to position feedback control of brushless, sensorless DC motors from standstill.

A brushless DC motor typically has a number of permanent magnets mounted on a rotor and a set of electromagnetic coils mounted on a stator. The rotor is made to rotate by energizing the coils in a specific sequence relative to the angular position of the rotor. The function of energizing the coils at specific points in the rotation is called "commutation" of the motor.

One prior method of motor commutation utilizes Hall sensors mounted on the stator for sensing the angular position of the rotor. Electronic circuits connected to the Hall sensors detect the passage of the rotor past the Hall sensors and switch the energy into a different electromagnetic coil (commutate) at that instant. This prior method of commutation of a brushless DC motor has a number of disadvantages. First, since Hall sensors are required, costs are increased. Further, reliability is frequently poor. If the Hall sensors are not accurately positioned, the motor will not operate efficiently. Other disadvantages include the Hall sensors taking up space and requiring additional wires to operate.

A second commutation method is based on back electromotive force (EMF) sensing. When the rotor rotates due to a coil being energized, an electromagnetic field is induced in the coils which are not currently energized. By sensing the resulting back EMF, the correct commutation state of the motor can be determined. Back EMF commutation has advantages in that it does not require the use of Hall sensors. However, back EMF commutation has the disadvantage of poor performance when the motor is idle or moving slowly. This is particularly a problem during start-up when no back EMF fields are present. Frequently, from standstill, a guess as to the correct commutation state is made in an attempt to cause the motor to run fast enough to produce back EMF fields. This can result in the motor moving in the wrong direction, which can damage the magnetic data heads which are in contact with the magnetic discs at start-up.

A number of techniques for determining the correct commutation state at start-up have been used to start the motor spinning so that back EMF methods can be used. These techniques are typically time consuming, requiring considerable trial and error analysis to characterize the motor. Therefore, there is a need for an improved method for determining the correct commutation state of a brushless DC motor from standstill without the use of Hall-type sensors.

SUMMARY OF THE INVENTION

The present invention arises from the realization that, by writing motor position signals in the landing zone area of a magnetic disc surface of a magnetic data storage system, and by reading the motor position signals from the landing zone area prior to or just after motor start-up, the commutation state of the motor can be determined without the use of Hall sensors or back EMF sensing techniques. Thus, the motor can be more efficiently commutated from standstill without the use of Hall sensors. If desired, back EMF sensing commutation techniques can be employed after the motor attains sufficient speed.

A method of, and an apparatus for, starting a brushless DC motor from standstill in a magnetic data storage system are disclosed. At least one motor position signal written on at least one magnetic disc surface is sensed. A commutation state of the motor is determined as a function of the at least one sensed motor position signal. The motor is controlled based upon the determined commutation state.

DETAILED DESCRIPTION OF THE PREFERRED EMBODIMENTS

The present invention includes a method of, and an apparatus for, determining the position, phase or commutation state of a brushless DC motor at zero or low RPM, without the use of Hall sensors in the motor. The commutation state is determined by reading previously written signals from the disc or discs of a data storage system. The signals are indicative of the motor position or commutation state and are written in the landing zone of the disc(s), in positions which are under the magnetic data heads just prior to and/or immediately after motor start-up. These signals can be read at zero RPM using magnetoresistive (MR) head technology. Alternatively, the signals can be read from the landing zone at low RPMs using either MR head technology or inductive head technology.

Figure 1:
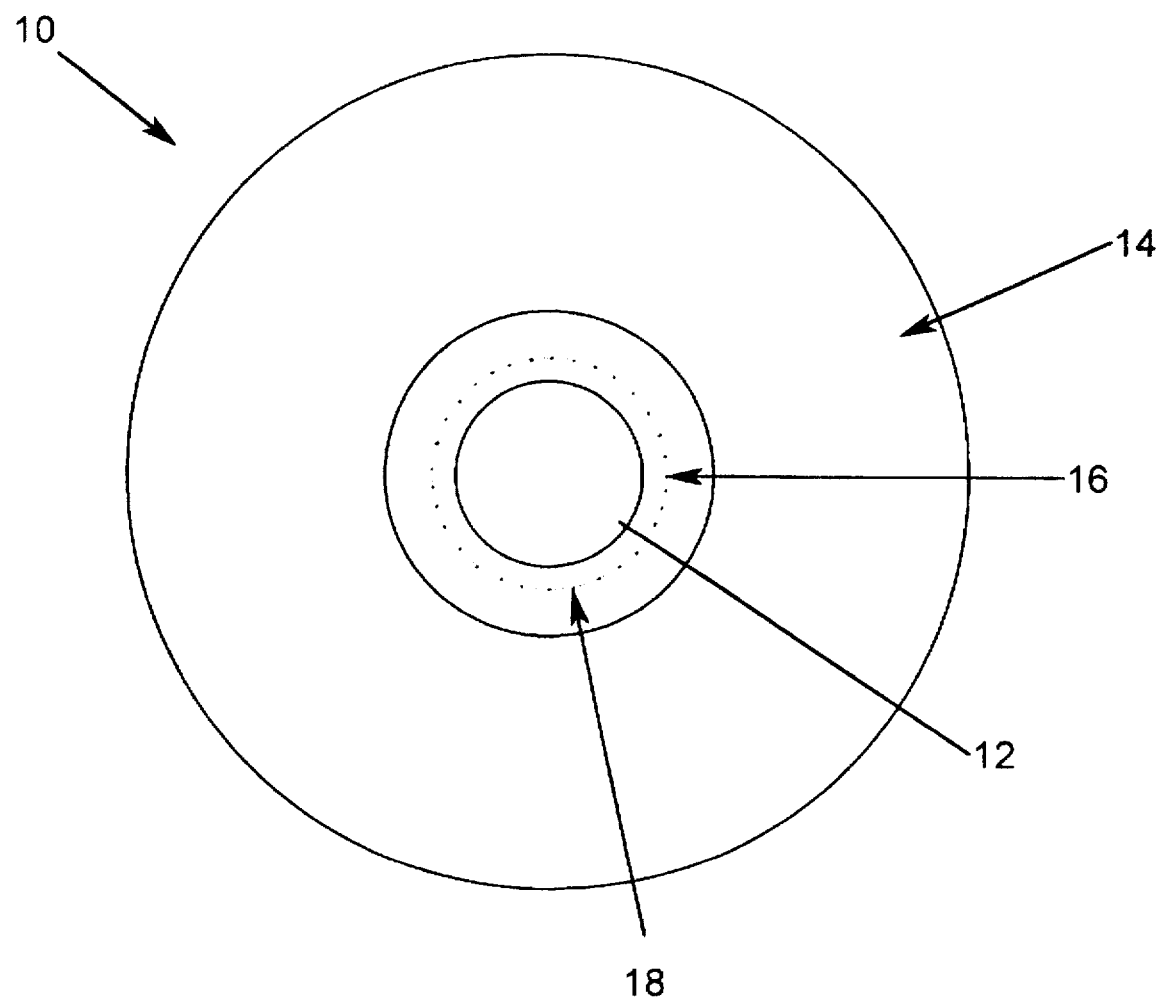
FIG. 1 is a diagrammatic top view of a magnetic data storage disc in accordance with preferred embodiments of the present invention having motor position or commutation state identifying signals written in the landing zone region.

FIG. 1 is a top view of magnetic data storage disc 10 in accordance with preferred embodiments of the present invention. Disc 10 is similar to conventional magnetic data storage discs in that it has a spindle receiving hole 12 for receiving a spindle, a conventional data storage area 14 and a landing zone area 16. Hole 12 cooperates with a spindle and a brushless DC motor (shown in FIG. 2) to rotate or spin disc 10. In normal operation, data is written to and/or read from data storage area 14 while disc 10 rotates and while a magnetic data head (shown in FIG. 2) on a slider "flies" above the surface of the disc. When reading/writing operations are completed and the disc is allowed to stop rotating, the magnetic data head is positioned over landing zone 16. As the RPM's of disc 10 approach zero, the magnetic data head comes to rest in landing zone 16 such that it is in physical contact with the surface of the disc. Although in FIG. 1 landing zone 16 is illustrated in the center region of disc 10, landing zone 16 can be located in other regions of disc 10 instead.

Magnetic data storage disc 10 of the present invention differs from conventional data storage discs in that it includes motor position or commutation state indicative signals (as represented diagrammatically at reference numeral 18) written in landing zone 16 of the disc. The motor position signals are written in landing zone 16 at locations which are under the magnetic data head just prior to and/or after motor start-up. With MR head technology, magnetic polarity at zero RPM can be sensed. Since the resistance of an MR head is dependent upon flux magnitude or strength (polarity), and not upon flux rates of change as is the case with inductive heads, MR heads can measure the motor position signals without having to move the disc. Thus, by reading the motor position signals from landing zone 16 while at a standstill, the correct commutation state can be determined for use in ensuring proper and efficient start-up. In the alternative, using inductive magnetic head technology, the motor position signals can be read from landing zone 16 by initially spinning the disc slowly (i.e., at speeds having significantly lower RPM than a normal operating speed) and subsequently determining the correct commutation state.

As discussed in detail below, the present invention can be implemented in its various embodiments using a single surface of a single magnetic data disc, or using multiple surfaces from two or more magnetic data discs. In preferred embodiments of the present invention, the motor position signals are written in the landing zones of the disc surfaces (the tracks where the heads will be when the motor is at zero RPM just before start-up) so that the heads can read the signals when the disc(s) are at or near standstill. These signals can be written to the disc surfaces at any time the motor is correctly up to speed and spinning (i.e., any time the correct motor position is known, such as during servo track writing or during other manufacturing tests or processes). Starting of the motor prior to writing the motor position signals onto the disc(s) is performed using any of a variety of conventional start-up techniques. Thereafter, reliable motor start-up can be assured by reading the position signals from the landing zones of the discs.

Figure 2:
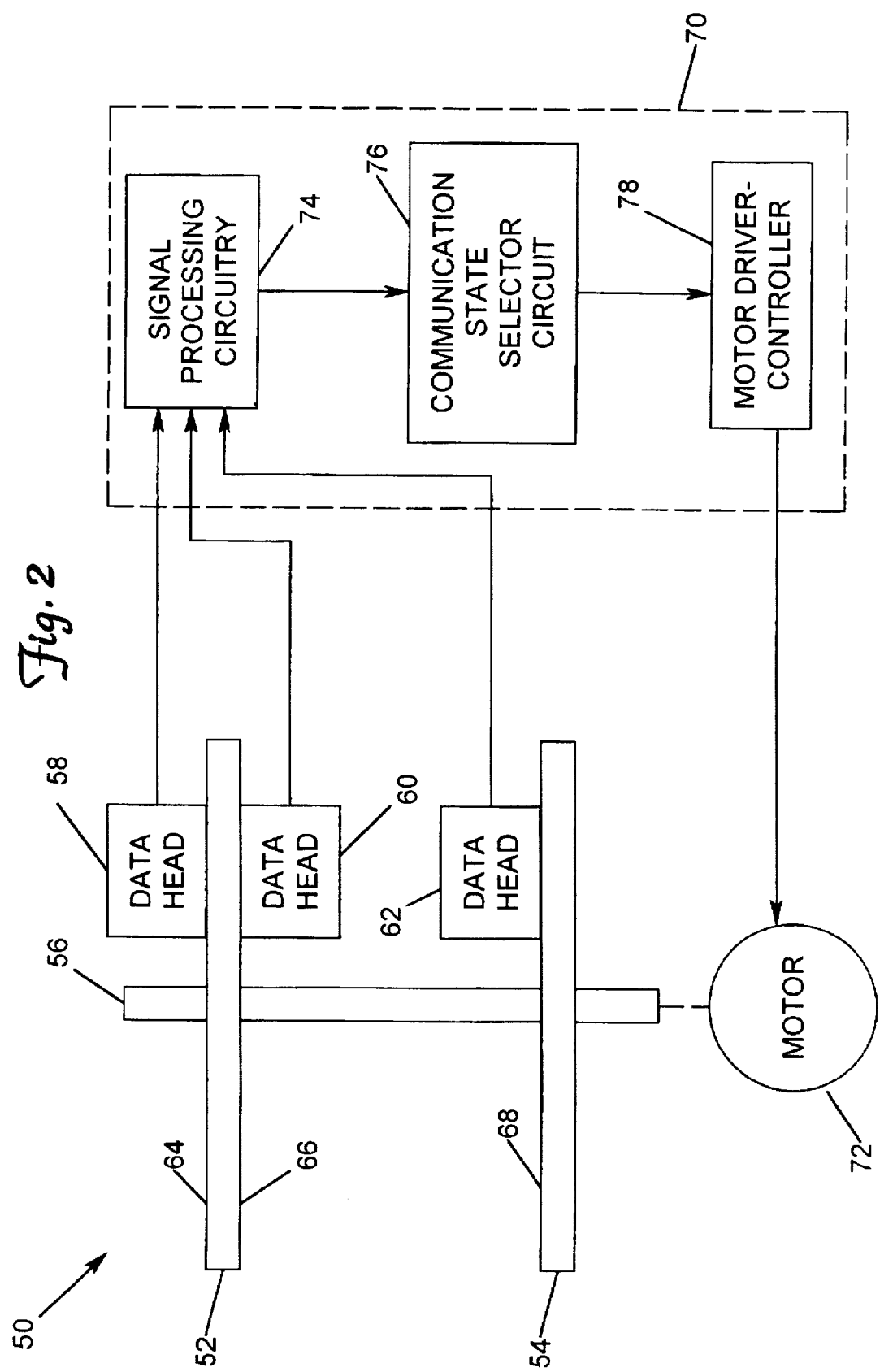
FIG. 2 is a block diagram of a disc drive data storage system having a control circuit, in accordance with preferred embodiments of the present invention, which determines the commutation state of the motor using the motor position signals and controls the motor from standstill based upon the determined commutation state.

FIG. 2 is a block diagram of a disc drive data storage system having a control circuit which determines the commutation state or position of the brushless DC motor based upon the motor position signals written in the landing zones. The control circuit uses the determined commutation state to drive or control the motor from standstill. Disc drive data storage system 50 includes magnetic discs 52 and 54, magnetic data heads 58, 60 and 62, control circuit 70 and brushless DC motor 72. Discs 52 and 54 are mounted on spindle 56 which is physically coupled to motor 72. Each of the discs 52 and 54 is similar to disc 10 shown in FIG. 1 in that motor position signals are written in the landing zone area of the disc surfaces. Each of magnetic data heads 58, 60 and 62 is positioned adjacent to a corresponding one of disc surfaces 64, 66 and 68.

During reading and/or writing operations, the data heads fly above data storage area 14 (shown in FIG. 1) of each of disc surfaces 64, 66 and 68. Prior to reading and/or writing operations, the data heads rest in the landing zones of the corresponding disc surfaces, in positions from which the motor position signals written in the landing zones can be read. In embodiments in which data heads 58, 60 and 62 are MR data heads, the motor position signals can be read from the landing zones while the discs are at a standstill. These embodiments are discussed in further detail with reference to FIG. 3. In other embodiments in which data heads 58, 60 and 62 are inductive data heads, the discs must be spun at least slowly to create a flux rate of change before the position signals can be read from the landing zones. These other embodiments are discussed in further detail with reference to FIG. 3. In either case, the outputs of the data heads are indicative of the signals read from the landing zones, and thus of the motor position or commutation state.

The output of each of data heads 58, 60 and 62 is electrically coupled to control circuit 70 which determines the correct commutation state and uses that information to drive or control motor 72 from standstill or from a low RPM. Control circuit 70 is electrically coupled at its output to motor 72 and provides control or drive signals to commutate the motor. Motor 72 is a brushless DC motor which is physically coupled to spindle 56 for controllably spinning spindle 56 and discs 52 and 54 in response to the control signals provided by control circuit 70.

Control circuit 70 includes signal processing circuitry 74, commutation state selector circuit 76 and motor driver/controller 78. Signal processing circuitry 74 receives the outputs of the magnetic data heads and processes, conditions and/or converts the outputs of the data heads to a desired format which is indicative of the data read from the surfaces of discs 52 and 54. As such, signal processing circuitry 74 can be any of a wide variety of circuits known in the art. Although signal processing circuitry 74 can be used to process any signals read from the magnetic data discs, of particular importance to the invention, signal processing circuitry 74 processes the motor position signals read by the magnetic data heads from the landing zones of the surfaces of the discs.

Commutation state selector circuit 76, which is coupled to the output of signal processing circuitry 74, uses the information read by the magnetic data heads and processed by circuit 74 to determine the current motor position or commutation state. The output of commutation state selector 76 is indicative of the motor commutation state and is provided to motor driver/controller 78 which selectively energizes the coils of motor 72 to effect rotation of the motor, and thus of spindle 56. It must be noted that, although control circuit 70 is described as including signal processing circuitry 74, commutation state selector circuit 76 and motor driver/controller 78, in other embodiments control circuit 70 can be any combination of circuits and/or devices adapted for receiving the motor position signals from the data heads and controlling motor 72 in response.

The motor position signals written in the landing zone areas of the disc surfaces can be of a variety of different formats. While preferred formats of the motor position signals are discussed, it must be noted that other formats are possible which are also intended to fall within the scope of the invention.

For embodiments of the present invention in which MR data heads are used to read the motor position signals while the motor and discs are at a standstill, a binary code can be defined for all possible commutation states of the DC motor. For example, the commutation states of a brushless DC motor having six commutation states can be binary coded into a three-bit word as shown in Table 1 below:

TABLE 1

| Commutation State | 3-Bit Binary Word |
|---|---|
| 1 | 000 |
| 2 | 001 |
| 3 | 010 |
| 4 | 011 |
| 5 | 100 |
| 6 | 101 |

The binary code can be written to the surfaces of the discs in the landing zone tracks, with each bit of the binary code written onto a separate disc surface. In other words, in preferred embodiments in which the commutation states are coded into binary words and in which the signals are to be read while the disc(s) are at a standstill, preferably at least as many disc surfaces are available as the number of bits needed to code the commutation states of the motor. Further, brushless DC motors typically have commutation states which are repeated twice per revolution. If the landing zone tracks are represented for illustrative purposes as being stretched in a straight line from left to right, each commutation state can be written to the landing zones of the discs as shown below in Table 2:

TABLE 2

| Disc Surface | Commutation State .1..2..3..4..5..6..1..2..3..4..5..6. |
|---|---|
| Surface 1 | .0..0..0..0..1..1..0..0..0..0..1..1. |
| Surface 2 | .0..0..1..1..0..0..0..0..1..1..0..0. |
| Surface 3 | .0..1..0..1..0..1..0..1..0..1..0..1. |
| | ← One Revolution → |

Each bit of a particular binary word is written repeatedly, in the landing zone of its respective disc surface, through out a region which corresponds to the associated motor commutation state. Thus, if the discs are stopped in any of a range of positions corresponding to a particular motor commutation state, the MR data heads will individually read from the associated discs the bits of the binary word which identifies the particular commutation state. As an example, if the motor is at a standstill in any of a range of positions corresponding to the fourth commutation state, the individual bits of the binary coded word corresponding to the fourth commutation state will be read from the surfaces of the discs. In the case of the binary code illustrated in Tables 1 and 2 as an example, the binary word "011" would be collectively read. If the first, second and third surfaces referenced in Table 2 correspond to surfaces 64, 66 and 68 of system 50 shown in FIG. 2, data head 58 would read a "0" from surface 64 while each of data heads 60 and 62 would read a "1" from surfaces 66 and 68, respectively.

As discussed above, in embodiments of the present invention in which the data heads are MR data heads, the data heads can be used to read the motor position signals from surfaces 1, 2 and 3 before motor power is applied. The MR data heads can identify the correct polarity of the signal written beneath it, either "0" or "1", and using this information the correct motor commutation state can be decoded or identified by commutation state selector circuit 76. Motor driver/controller 78 is brought to this state as power is applied to motor 72, which will insure correct motor spin direction.

Although the invention has thus far been described largely with respect to reading the motor position signals while the discs are at a standstill, the motor position signals written on the discs in the landing zones can be continually read during motor spin-up (i.e., as motor speed increases). Using these signals, correct motor commutation can be ensured as the motor 72 accelerates from standstill. When motor 72 accelerates to a sufficient speed, motor back EMF can be used to continue the motor commutation. At this point, reading the motor position signals from the discs will no longer be necessary, thus allowing the data heads to be used for data storage/retrieval from data storage areas 14 in normal disc drive applications.

In embodiments in which magnetic data heads 58, 60 and 62 are inductive data heads, the coded commutation states discussed above can be read from the surfaces of the discs by initially spinning the motor and discs in either direction by some small amount, preferably at low speed. The speed at which the motor and discs can be spun depends upon the data head/read chain capabilities of the system. As soon as the motor position signals are read from the surfaces of the discs, the correct motor commutation state can be determined and thereafter used to accurately and reliably commutate the motor. Once again, the data heads can continue to read the motor position signals as the motor is accelerated to a speed at which back EMF is generated. At this point, the data heads can be used for data storage/retrieval in normal disc drive applications.

In yet other embodiments of the present invention, the commutation state can be determined using only a single data head. In these embodiments, the motor position signals are written in the landing zone or elsewhere on the disc in patterns which identify the current motor commutation state. While the disc is spinning shortly after start-up, the data head reads the pattern from the currently adjacent zone or region of the disc, thus identifying the current commutation state. Preferably, the motor position signals are written on the disc in patterns which identify the correct commutation state regardless of which direction the disc is spinning. Further, in some preferred embodiments, a synchronization field or pattern of signals is included between adjacent patterns corresponding to different commutation states of the motor. An example of position signal patterns for two commutation states is shown below in Table 3.

TABLE 3

| FIRST COMMUTATION STATE | SYNC FIELD | SECOND COMMUTATION STATE |
|---|---|---|
| 0110110110110110110 | 10101010 | 1110111011101110 |

As can be seen in Table 3, the motor position signal patterns in the zones corresponding to the first commutation state, the synchronization field and the second commutation state are all identifiable regardless of the direction in which the motor is spinning. In the embodiment shown in Table 3, this is accomplished by using reversible patterns which provide the same data chain regardless of the direction in which the motor is spinning.

Figure 3:
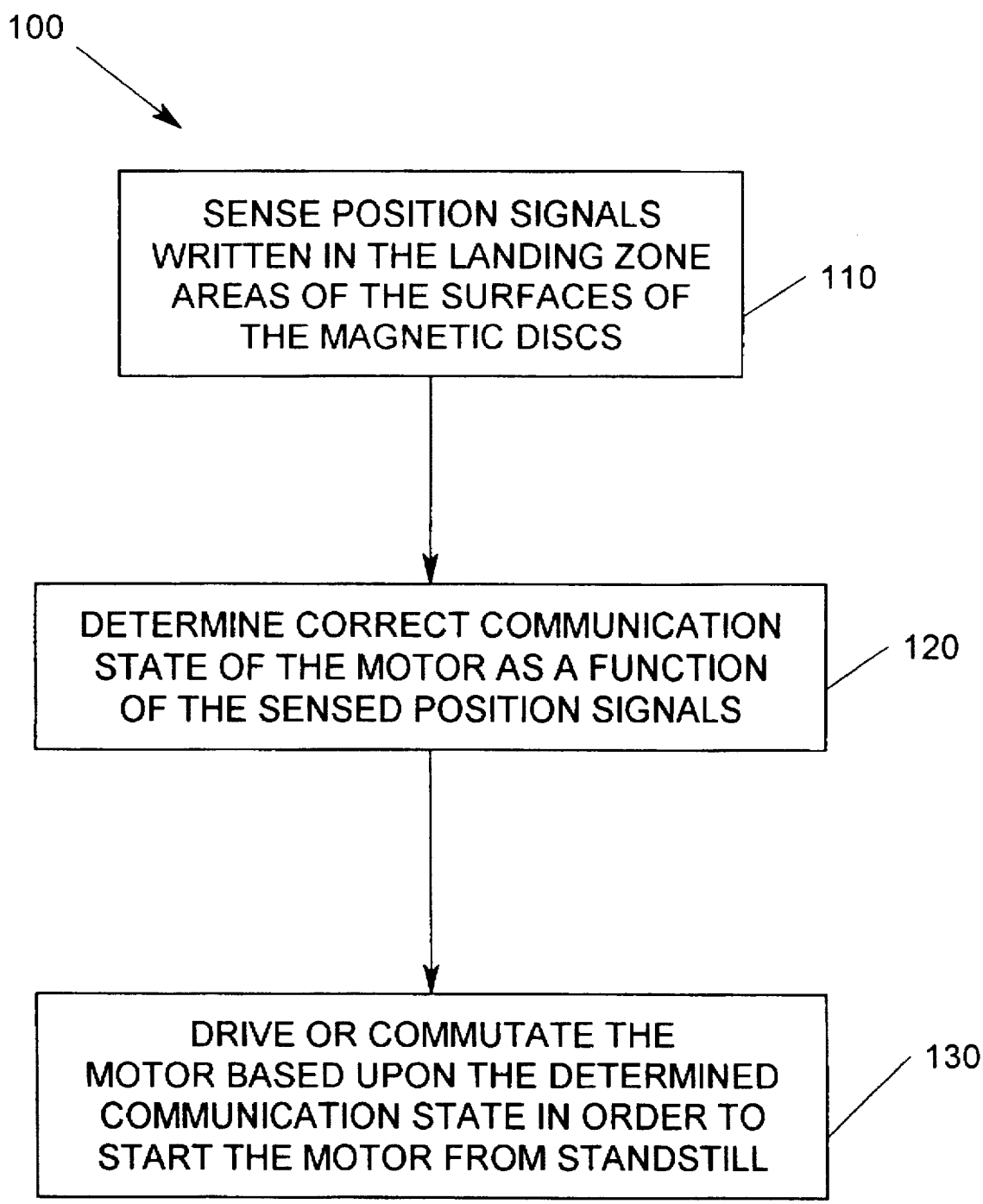
FIG. 3 is a flow diagram illustrating one preferred method of determining the motor commutation state from standstill in accordance with preferred embodiments of the present invention.

FIG. 3 is a flow diagram illustrating one preferred method, discussed above, of determining the motor commutation state from standstill in accordance with preferred embodiments of the present invention. The method referred to generally at 100 includes the following steps:

Step 110: Sense the motor position signals written in the landing zone areas of the surface of at least one disc. As discussed above, the motor position signals can be written in a variety of different formats. The motor position signals can be written in the landing zone area of a single disc surface, or in the landing zone areas of multiple disc surfaces. Further, the motor position signals can be sensed with MR data heads while the disc(s) and motor are at a standstill, or the signals can be sensed while the disc(s) and motor are spinning using either MR data heads or inductive data heads. In the later case, step 110 further includes the sub-step of spinning the motor by at least a small amount at a relatively low speed. As discussed above, in some embodiments, from standstill the motor can be spun by a small amount in either direction prior to reading or sensing the motor position signals.

Step 120: Determine the correct commutation state of the motor as a function of the sensed motor position signals.

Step 130: Drive or commutate the motor based upon the determined commutation state in order to start the motor from standstill or from low RPM.

Although the present invention has been described with reference to preferred embodiments, workers skilled in the art will recognize that changes may be made in form and detail without departing from the spirit and scope of the invention.

What is claimed is:

1. A method of starting a brushless DC motor from standstill in a magnetic data storage system, comprising:
   sensing at least one motor position signal written in a landing zone area of at least one magnetic disc surface;
   determining a commutation state of the motor as a function of the at least one sensed motor position signal; and
   controlling the motor based upon the determined commutation state.

2. The method of claim 1, wherein sensing the at least one motor position signal written in the landing zone area of the at least one magnetic disc surface further comprises sensing a plurality of motor position signals from landing zone areas of a plurality of magnetic disc surfaces, wherein at least one of the plurality of motor position signals is sensed from the landing zone area of each of the plurality of magnetic disc surfaces, the plurality of motor position signals together being indicative of the commutation state of the motor.

3. The method of claim 2, wherein determining the commutation state of the motor further comprises determining the commutation state of the motor as a function of the plurality of motor position signals.

4. The method of claim 3 wherein sensing the plurality of motor position signals from landing zone areas of the plurality of magnetic disc surfaces further comprises sensing the plurality of motor position signals from the landing zone areas of the plurality of magnetic disc surfaces while the motor is at a standstill.

5. The method of claim 3 wherein sensing the plurality of motor position signals from landing zone areas of the plurality of magnetic disc surfaces further comprises sensing the plurality of motor position signals from the landing zone areas of the plurality of magnetic disc surfaces while the motor is spinning at low RPM.

6. The method of claim 3 wherein each commutation state of the motor has a binary coded word associated therewith and wherein the plurality of motor position signals together are indicative of the binary coded word of the commutation state of the motor, wherein determining the commutation state of the motor further comprises determining the commutation state of the motor as a function of the binary coded word indicated by the plurality of motor position signals.

7. The method of claim 3, wherein sensing the plurality of motor position signals from landing zone areas of the plurality of magnetic disc surfaces further comprises sensing the plurality of motor position signals from the landing zone areas of the plurality of magnetic disc surfaces using a plurality of magnetic data sensing heads, with at least one of the plurality of magnetic data sensing heads corresponding to each of the plurality of magnetic disc surfaces.

8. The method of claim 9, wherein sensing the plurality of motor position signals from the landing zone area of the plurality of magnetic disc surfaces using a plurality of magnetic data sensing heads further comprises sensing the plurality of motor position signals from the landing zone areas of the plurality of magnetic disc surfaces using a plurality of magnetoresistive data sensing heads, with at least one of the plurality of magnetoresistive data sensing heads corresponding to each of the plurality of magnetic disc surfaces.

9. The method of claim 7, wherein sensing the plurality of motor position signals from the landing zone areas of the plurality of magnetic disc surfaces using a plurality of magnetic data sensing heads further comprises sensing the plurality of motor position signals from the landing zone areas of the plurality of magnetic disc surfaces using a plurality of inductive data sensing heads, with at least one of the plurality of inductive data sensing heads corresponding to each of the plurality of magnetic disc surfaces.

10. The method of claim 1 wherein sensing the at least one motor position signal written in the landing zone area of the at least one magnetic disc surface further comprises sensing a plurality of motor position signals written in a pattern in the landing zone area of a first magnetic disc surface using a first magnetic data head, the plurality of motor position signals written in the pattern in the landing zone area of the first magnetic disc surface being sensed using the first magnetic data head after the motor has begun spinning.

11. The method of claim 10 wherein each commutation state of the motor has a motor position signal pattern associated therewith, the step of determining the commutation state of the motor as a function of the at least one sensed motor position signal further comprising determining the commutation state of the motor as a function of the pattern of the plurality of motor position signals sensed using the first magnetic data head.

12. The method of claim 10, wherein each commutation state of the motor has a repeating motor position signal pattern associated therewith, the motor position signals associated with each repeating pattern being such that the repeating pattern can be sensed using the first magnetic data head with the motor spinning in either direction, the step of determining the commutation state of the motor as a function of the at least one sensed motor position signal further comprising determining the commutation state of the motor as a function of the repeating pattern of the plurality of motor position signals sensed using the first magnetic data head while the motor is spinning in either direction.

13. A method of starting a brushless DC motor from standstill in a magnetic data storage system having a first magnetic disc surface and a second magnetic disc surface, the magnetic data storage system also having a first magnetic data head positioned adjacent the first magnetic disc surface for sensing signals from the first magnetic disc surface and a second magnetic data head positioned adjacent the second magnetic disc surface for sensing signals from the second magnetic disc surface, each of the first and second magnetic disc surfaces having a data storage area and a landing zone area, the method comprising:
   sensing a first motor position signal, written in the landing zone area of the first magnetic disc surface, using the first magnetic data head while the motor is at a standstill;
   sensing a second motor position signal, written in the landing zone area of the second magnetic disc surface, using the second magnetic data head while the motor is at a standstill;
   determining a commutation state of the motor as a function of the sensed first and second motor position signals; and
   controlling the motor based upon the determined commutation state.

14. A magnetic data storage system having a first magnetic disc and a motor coupled to the first magnetic disc for controllably spinning the first magnetic disc, the first magnetic disc having a first magnetic disc surface which includes a data storage area and a landing zone area, the magnetic data storage system also having a first magnetic data head positioned adjacent the first magnetic disc surface for sensing signals from the first magnetic disc surface, the magnetic data storage system comprising:

motor position signals written in the landing zone area of the first magnetic disc surface, the motor position signals being indicative of a commutation state of the motor, at least one motor position signal being sensed from the landing zone area of the first magnetic disc surface by the first magnetic data head;

means for determining the commutation state of the motor as a function of the at least one motor position signal sensed from the landing zone area of the first magnetic disc surface by the first magnetic data head; and means for controlling the motor based upon the determined commutation state.

* * * * *

UNITED STATES PATENT AND TRADEMARK OFFICE
CERTIFICATE OF CORRECTION

PATENT NO. : 5,633,570
DATED : May 27, 1997
INVENTOR(S) : Motzko

It is certified that error appears in the above-indentified patent and that said Letters Patent is hereby corrected as shown below:

In section [56], insert the following reference:

4,639,798   1/87   Harrison et al.   360   73

In section [57] Abstract, delete "communication" and insert --commutation--.

Signed and Sealed this

Seventh Day of October, 1997

Attest:

BRUCE LEHMAN

*Attesting Officer*     *Commissioner of Patents and Trademarks*